United States Patent [19]
Grewe

[11] Patent Number: 5,859,765
[45] Date of Patent: Jan. 12, 1999

[54] DEVICE FOR RECORDING FLIGHT DATA

[75] Inventor: Reinhold Grewe, Oberuhldingen, Germany

[73] Assignee: Dornier GmbH, Friedrichshafen, Germany

[21] Appl. No.: 729,979

[22] Filed: Oct. 11, 1996

[30] Foreign Application Priority Data

Oct. 11, 1995 [DE] Germany ................. 195 37 810.5

[51] Int. Cl.⁶ .................................. H01L 23/28
[52] U.S. Cl. .................. 361/724; 174/52.2; 206/521; 455/98
[58] Field of Search ................. 244/1 R; 360/5, 360/118; 307/86; 369/21, 69, 75.1; 455/95, 96, 98; 361/600, 679, 724, 807, 809, 816, 818; 206/305, 521, 722, 723, 811; 220/88.1; 174/52.2, 52.3

[56] References Cited

U.S. PATENT DOCUMENTS

| | | |
|---|---|---|
| 3,327,067 | 6/1967 | Boniface . |
| 4,694,119 | 9/1987 | Groenewegen . |
| 4,944,401 | 7/1990 | Groenewegen . |
| 5,123,538 | 6/1992 | Groenewegen . |
| 5,285,559 | 2/1994 | Thompson ............................ 29/841 |
| 5,438,162 | 8/1995 | Thompson ............................ 174/52.2 |
| 5,697,230 | 12/1997 | Ender ................................. 68/355 |

FOREIGN PATENT DOCUMENTS

| | | |
|---|---|---|
| 15 06 020 | 11/1969 | Germany . |
| 32 43 495 | 5/1984 | Germany . |

*Primary Examiner*—Gerald Tolin
*Attorney, Agent, or Firm*—Evenson, McKeown, Edwards & Lenahan, P.L.L.C.

[57] ABSTRACT

Device for recording flight data in a data recorder located in a spherical metal housing with thermal insulation on the interior surface and with connecting lines between the data recorder and data sources.

11 Claims, 6 Drawing Sheets

DEVICE FOR RECORDING FLIGHT DATA

BACKGROUND AND SUMMARY OF THE INVENTION

The invention relates to a device for recording flight data with a data recorder located in a protective metal housing with thermal insulation.

A device of this kind is known from German patent document DE 32 43 495 C2, in which the information is recorded on magnetic tape.

On-board flight recorders are known from German patent document DE-OS 15 06 020, U.S. Pat. No. 3,327,067, and the periodical Interavia 10/1966 pages 1560–1566 "Flight Recorders for Accident Investigation and Maintenance." These flight recorders for recording flight data are located in a mechanically and thermally shielded housing. The housing is located on a plug-in module inside an aircraft or helicopter. The flight recorders weigh up to 10 kg and are accommodated in correspondingly large containers. A considerable expenditure of time and effort is necessary to install these containers in the aircraft since the device must be secured on a plug-in module. Moreover, it is disadvantageous that, because of the design size, it must be accommodated inside the aircraft and, in the event of an accident, the device can be damaged by heavy aircraft components impacting it, despite its reinforcement, so that flight data for evaluating the course of the accident are not available. Also, these devices are difficult to recover when the accident has taken place over water.

The goal of the invention is to design a device for recording flight data with small dimensions and low weight that ensures a high degree of data recovery reliability in the event of an accident.

The primary goal is to accommodate the device in areas of the aircraft exposed to only small degrees of damage in the event of accidents, in a way that is easily possible, and enables flight data to be recorded with increased information density. A high degree of data security must be ensured.

This goal is achieved according to the present invention by a device for recording flight data with a data recorder located in a protective metal housing with thermal insulation on the interior and with connecting lines between the data recorder and data sources. The protective housing is a hollow sphere with an outer diameter of 5–8 cm consisting of two, firmly-joined hemispherical shells. A hole for the data lines is located in the wall of the sphere. The data recorder is a solid-state memory recorder embedded in a block of casting compound filling the cavity in the sphere.

It is an advantage of the present invention that the hemispherical shells be force-fitted together. Further, the shells are advantageously connected together via a screw thread.

It is further advantageous for one hemispherical shell to be flattened in the area of the hole for the data line. At least one other hole is provided for attachment members for connection to a component of the aircraft.

In another embodiment according to the invention, several spheres are installed separately in the aircraft and are connected together by point-to-point or ring-shaped signal lines. At least one of the spheres is installed in a watertight manner in a life raft of the aircraft.

The recorder according to the invention is approximately the size and shape of a tennis ball and is thus very different in appearance from known devices.

Other objects, advantages and novel features of the present invention will become apparent from the following detailed description of the invention when considered in conjunction with the accompanying drawings.

DETAILED DESCRIPTION OF THE DRAWINGS

Figure 1:
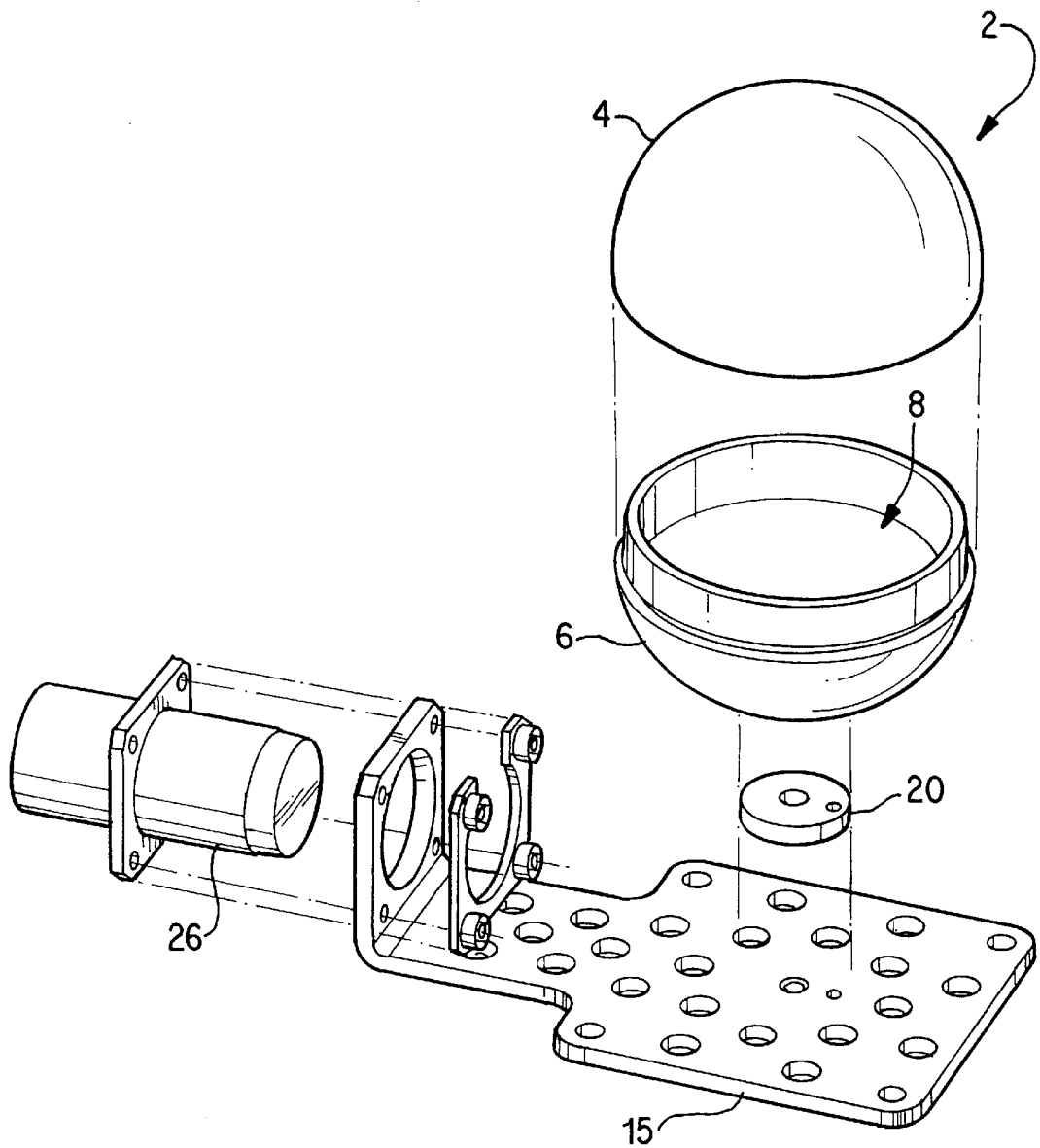
FIG. 1 shows a device according to the invention axonometrically.
Figure 2:
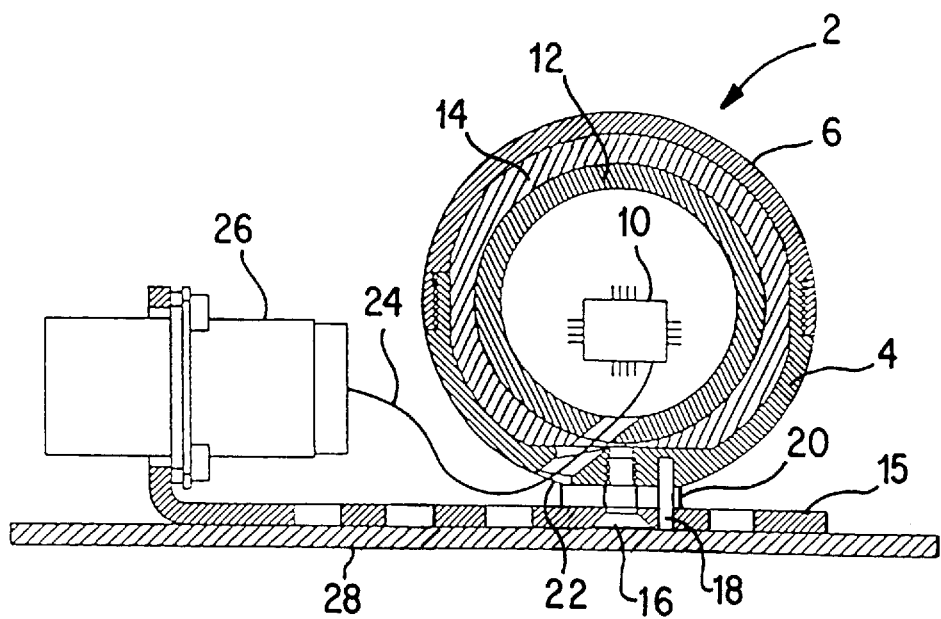
FIG. 2 is a cross section of the device in FIG. 1 in an assembled state.

The crash recorder according to the invention is a small sphere 2. FIG. 1 is an exploded diagram of the sphere 2 consisting of two hemispherical shells 4, 6. The hemispherical shells are made of a metal material, for example, steel. The sphere is approximately the size of a tennis ball and its outside has a signaling color (e.g. bright red). The storage electronics 10 shown in FIG. 2, provided in a casting compound 12 in a spherical shape, are placed in the cavity 8 of the hemispherical shells 4, 6 after which the hemispherical shells 4, 6 are joined firmly together by force-fitting (FIG. 1) or by a screw thread connection (not shown).

Figure 6:
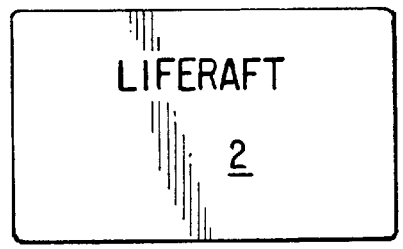
FIG. 6 is a block diagram illustrating the sphere in a life raft.

The interior of the hemispheres is provided with thermal insulation 14. One of the hemispheres 6 is flattened on one side and joined in this area to a plate 15 by means of a screw 16, centering pin 18, and spacer 20. In this area of the hemisphere 6, a hole 22 is provided for a data line 24. Data line 24 leads to a modular plug 26 connected to plate 15. The plug in turn is connected to data lines (not shown) coming from the data sources. Plate 15 is connected to a component 28 of an aircraft (FIG. 3) or a helicopter (FIG. 4). These figures show possible installation locations for the crash recorder 2 according to the invention in the tail and wings of an aircraft (FIG. 3) or in the tail of a helicopter (FIG. 4). The crash recorder with the size of a tennis ball can also be installed in a life raft as shown in FIG. 6.

Figure 5A:
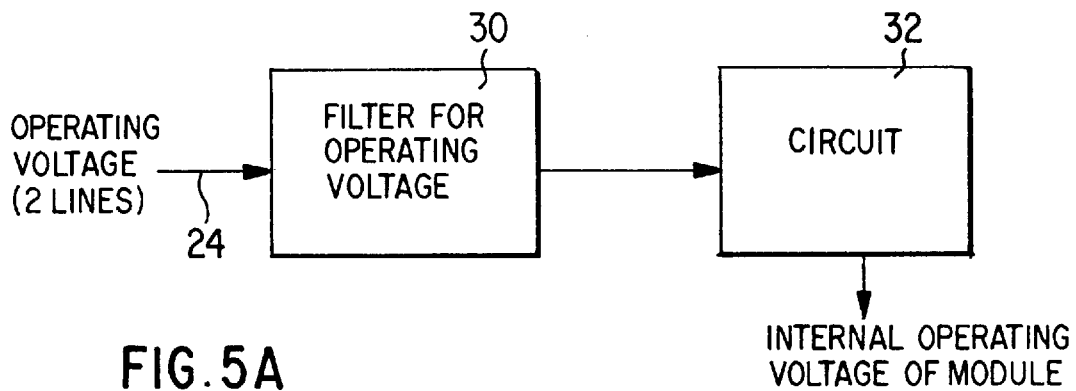
FIG. 5 is a block diagram of the storage electronics.
Figure 5B:
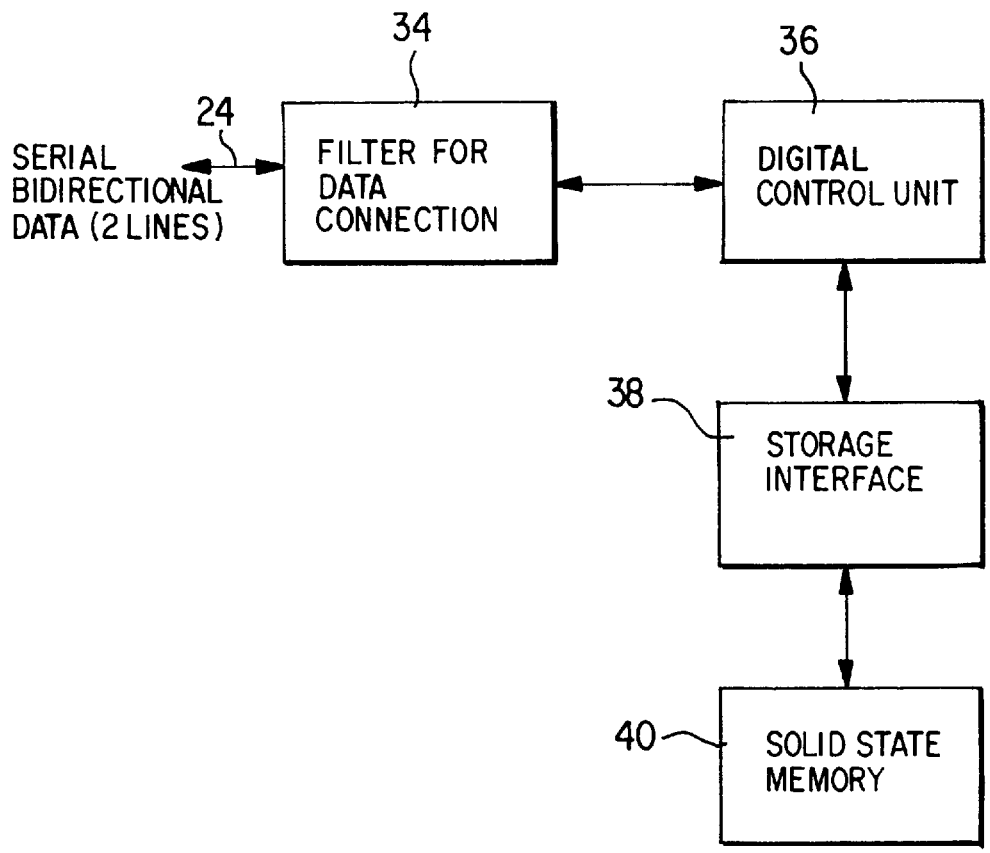

FIG. 5 shows, for example, several details of the storage electronics 10. Storage electronics 10 are connected to modular plug 26 by connecting lines 24. The power supply to the storage electronics of a storage module consists of a filter for the operating voltage 30 and a circuit 32 to generate regulated DC voltage. The data processing unit of the storage electronics of a storage module consist of a filter 34 and a serial data bus of a digital control unit 36, and storage interface 38, and a data storage device 40. The filter for data connection 34 suppresses high frequency interference and provides electromagnetic protection against unwanted radiation (e.g. transmitter antennas on the aircraft). Digital control unit 36 receives and sends the agreed data protocols from and to the on-board electronics and passes data to be stored and storage commands through the storage interface 38. Storage interface 38 writes and reads the data in storage device 40 of the storage module. Data storage device 40 consists of several storage modules that, in the event of a power outage, are nonvolatile, deletable, and reprogrammable.

Figure 3:
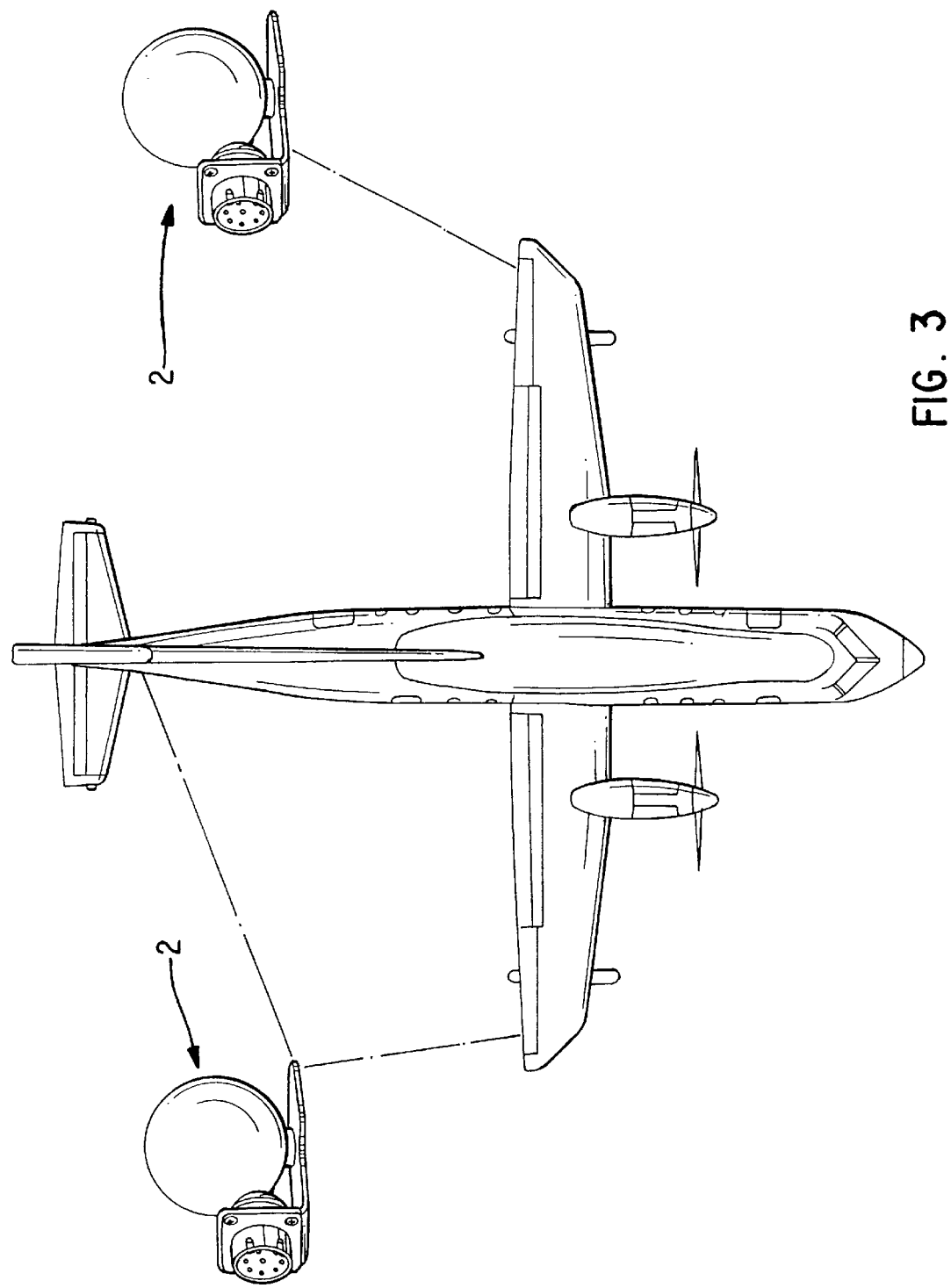
FIG. 3 shows possible locations of the device according to the invention in an aircraft.
Figure 4:
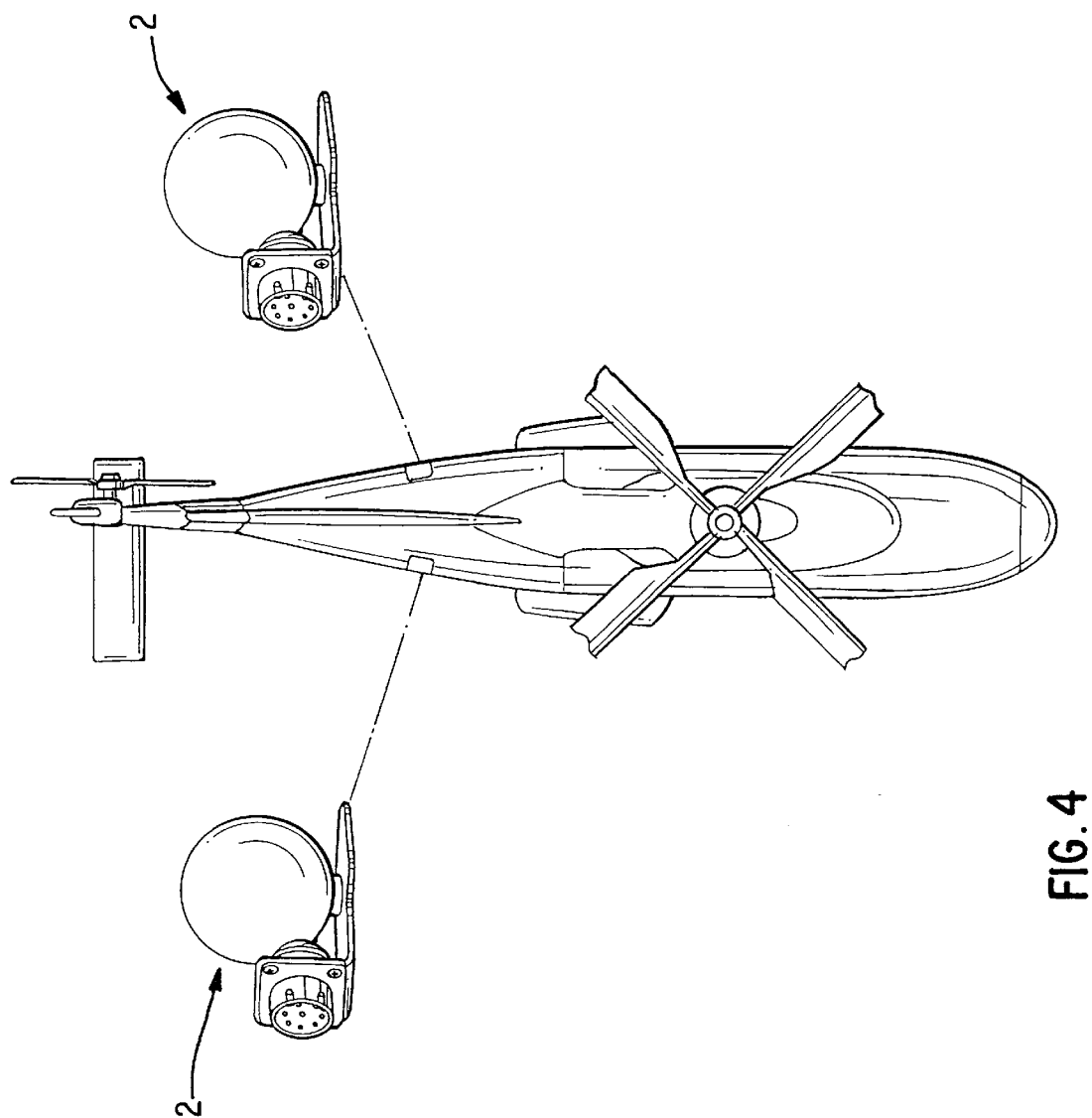
FIG. 4 shows possible locations of the device according to the invention in a helicopter.
Figure 7A:
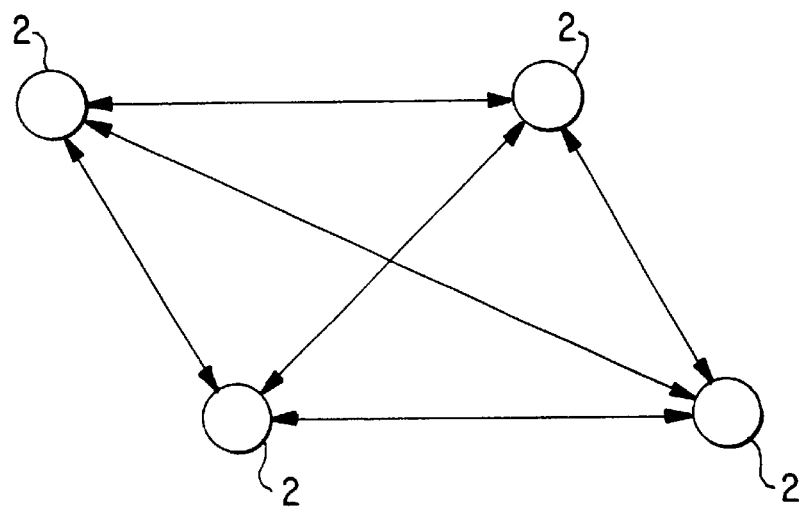
FIGS. 7A and 7B illustrate schematically a point-to-point and ring-shaped signal line, respectively, connecting several spheres according to the invention.
Figure 7B:
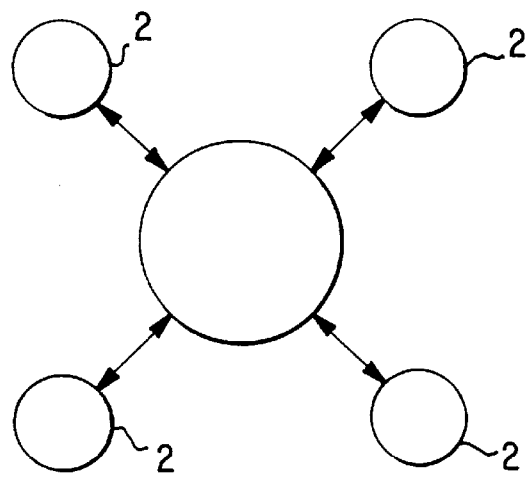

As shown in FIGS. 3 and 4, it is normal to install several crash recorder spheres 2 in an aircraft. The devices are connected with the data sources by either point-to-point (FIG. 7A) or ring-shaped signal lines (FIG. 7B). If necessary, the devices can also be installed in life rafts (FIG. 6).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for recording flight data in an aircraft with a data recorder located in a protective metal housing having thermal insulation in an interior thereof and with connecting lines arranged between the data recorder and data sources, the device comprising:

a hollow sphere forming said protective metal housing, said sphere having an outer diameter of about 5–8 cm adapted to fit areas of the aircraft which are exposed to minimal damage in an accident;

wherein said hollow sphere comprises two firmly-joined hemispherical shells;

a hole located in a wall of said hollow sphere for data lines;

a block of casting compound filling a cavity in said sphere, said data recorder being a solid-state memory recorder embedded in said block of casting compound; and wherein said solid-state memory recorder comprises (a) a power supply providing power to the data recorder via the connecting lines, and (b) a data processing unit receiving data from the connecting lines and including a digital control unit and a data storage device coupled thereto.

2. The device according to claim 1, wherein said hemispherical shells have a force-fitted connection.

3. The device according to claim 1, further comprising a screw thread connection connecting said hemispherical shells together.

4. The device according to claim 1, wherein one of said hemispherical shells has a flattened area in an area of said hole for said data lines, said one hemispherical shell having at least one further hole for an attachment device to connect said one hemispherical shell to a component of an aircraft.

5. The device according to claim 2, wherein one of said hemispherical shells has a flattened area in an area of said hole for said data lines, said one hemispherical shell having at least one further hole for an attachment device to connect said one hemispherical shell to a component of an aircraft.

6. The device according to claim 3, wherein one of said hemispherical shells has a flattened area in an area of said hole for said data lines, said one hemispherical shell having at least one further hole for an attachment device to connect said one hemispherical shell to a component of an aircraft.

7. The device according to claim 1, further comprising additional hollow spheres separately installed in an aircraft and coupled together via one of point-to-point and ring-shaped signal lines.

8. The device according to claim 2, further comprising additional hollow spheres separately installed in an aircraft and coupled together via one of point-to-point and ring-shaped signal lines.

9. The device according to claim 3, further comprising additional hollow spheres separately installed in an aircraft and coupled together via one of point-to-point and ring-shaped signal lines.

10. The device according to claim 4, further comprising additional hollow spheres separately installed in an aircraft and coupled together via one of point-to-point and ring-shaped signal lines.

11. The spherical device according to claim 7, wherein one of said hollow spheres is installed in a watertight manner in a life raft of the aircraft.

* * * * *